(12) United States Patent
Sylkatis

(10) Patent No.: US 8,240,743 B2
(45) Date of Patent: *Aug. 14, 2012

(54) APPARATUS FOR REDUCING NOISE IN A SOFT TOP VEHICLE

(76) Inventor: Michael Sylkatis, McKinney, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/945,855

(22) Filed: Nov. 13, 2010

(65) Prior Publication Data

US 2012/0112491 A1    May 10, 2012

Related U.S. Application Data

(62) Division of application No. 12/174,952, filed on Jul. 17, 2008, now Pat. No. 7,832,786.

(51) Int. Cl.
*B60J 7/00* (2006.01)

(52) U.S. Cl. .................................................. 296/120.1

(58) Field of Classification Search ............. 296/107.09, 296/120.1, 107.01, 121, 108, 107.08, 107.07, 296/107.17, 218, 146.14
See application file for complete search history.

(56) References Cited

U.S. PATENT DOCUMENTS

| | | | | |
|---|---|---|---|---|
| 3,146,022 A | * | 8/1964 | Zeller | 296/116 |
| 5,622,382 A | * | 4/1997 | Zepnik et al. | 280/756 |
| 5,641,193 A | * | 6/1997 | Zepnik et al. | 296/107.09 |
| 5,645,309 A | * | 7/1997 | Graf | 296/121 |
| 5,803,529 A | * | 9/1998 | Perry-Bores et al. | 296/107.09 |
| 6,068,326 A | * | 5/2000 | Shiromura | 296/120.1 |
| 6,073,989 A | * | 6/2000 | Hilliard et al. | 296/146.1 |
| 6,247,743 B1 | * | 6/2001 | Bonanno | 296/136.01 |
| 6,295,713 B1 | * | 10/2001 | Hilliard et al. | 29/446 |
| 6,378,930 B1 | * | 4/2002 | Brettmann | 296/85 |
| 6,409,247 B1 | * | 6/2002 | Maass | 296/107.13 |
| 6,550,843 B2 | * | 4/2003 | Patelczyk | 296/118 |
| 6,629,719 B2 | * | 10/2003 | Sims | 296/109 |
| 6,690,802 B2 | * | 2/2004 | Stickles et al. | 381/86 |
| 6,932,423 B2 | * | 8/2005 | Stevens et al. | 296/224 |
| 6,957,842 B1 | * | 10/2005 | Garska | 296/107.12 |
| 7,104,587 B2 | * | 9/2006 | MacNee et al. | 296/121 |
| 7,240,960 B2 | * | 7/2007 | Fallis et al. | 296/218 |
| 7,246,841 B2 | * | 7/2007 | Dilluvio | 296/107.09 |
| 7,325,832 B2 | * | 2/2008 | Miki et al. | 280/756 |
| 7,338,076 B2 | * | 3/2008 | Hamamoto et al. | 280/756 |
| 7,380,863 B2 | * | 6/2008 | Garska | 296/107.12 |
| 7,469,954 B2 | * | 12/2008 | Fallis et al. | 296/107.09 |
| 2005/0280280 A1 | * | 12/2005 | Heselhaus | 296/107.15 |
| 2008/0100089 A1 | * | 5/2008 | Schumacher et al. | 296/107.17 |

* cited by examiner

*Primary Examiner* — Kiran B Patel
(74) *Attorney, Agent, or Firm* — Michael Diaz

(57) ABSTRACT

An apparatus and method for reducing noise in a vehicle having a soft top roof. The apparatus includes a main extension bar having a first end and an opposing second end. A first coupling mechanism is affixed to the first end and a second coupling mechanism is affixed to the second end. The first and second coupling mechanisms are attached to roll bars located on a top portion of the vehicle. With the apparatus in place upon the roll bars, the main extension bar exerts upward force against the soft top roof of the vehicle, thereby reducing movement of the soft top roof and noise within the interior of the vehicle.

9 Claims, 4 Drawing Sheets

APPARATUS FOR REDUCING NOISE IN A SOFT TOP VEHICLE

RELATED APPLICATIONS

This application is a divisional application of a co-pending U.S. patent application Ser. No. 12/174,952 entitled "APPARATUS FOR REDUCING NOISE IN A SOFT TOP VEHICLE" filed Jul. 17, 2008 by Michael Sylkatis and is hereby incorporated by reference.

BACKGROUND OF THE INVENTION

1. Field of the Invention

This invention relates to vehicles. Specifically, and not by way of limitation, the present invention relates to an apparatus for reducing a noise level in a vehicle having a soft top roof.

2. Description of the Related Art

It is popular in many vehicles to have removable roofs. By removing top portions of the vehicle, the driver and its occupants may enjoy the outside environment, such as the wind and sunshine. Most removable roofs are constructed of a fabric, canvas or other flexible material. The flexible material allows the easy removal of the roof from the vehicle, either through manually removing the roof or through a convertible roof system wherein the roof collapses into a back portion of the vehicle body. However, because of the use of this flexible material, oftentimes the wind moves the roof, thereby causing a higher interior noise level. At times, the noise level rises to a point, where at high speeds, communication within the vehicle is either difficult or even impossible. It would be advantageous to have a device which reduces the noise caused by movement of the flexible roof while the vehicle moves. It is an object of the present invention to provide such an apparatus.

SUMMARY OF THE INVENTION

In one aspect, the present invention is directed to an apparatus for reducing noise in a vehicle having a soft top roof. The apparatus includes a main extension bar having a first end and an opposing second end. A first coupling mechanism is affixed to the first end and a second coupling mechanism is affixed to the second end. The first and second coupling mechanisms are attached to roll bars located on a top portion of the vehicle. With the apparatus in place upon the roll bars, the main extension bar exerts upward force against the soft top roof of the vehicle, thereby reducing movement of the soft top roof and noise within the interior of the vehicle.

In another aspect, the present invention is directed to a system for reducing noise in a vehicle. The system includes a vehicle having a soft top roof and a plurality of roll bars and a detachable apparatus for reducing noise. The apparatus includes a main extension bar having a first end and an opposing second end. Each end is attached to one of the roll bars of the vehicle. The main extension bar exerts upward force against the soft top roof of the vehicle, thereby reducing movement of the soft top roof as well as the noise level in the interior of the vehicle.

In still another aspect, the present invention is directed to a method of reducing noise in a vehicle having a soft top roof. The method begins by placing a retaining device under the soft top roof of the vehicle. The retaining device has a main extension bar with a first end having a first coupling mechanism and an opposing second end having a second coupling mechanism. Next, each coupling mechanism is placed on a top portion of a support bar of the vehicle. Upward force is then applied by the main extension bar against the soft top roof, thereby immobilizing a portion of the soft top roof and reducing the noise level in the vehicle.

DESCRIPTION OF THE INVENTION

Figure 1:
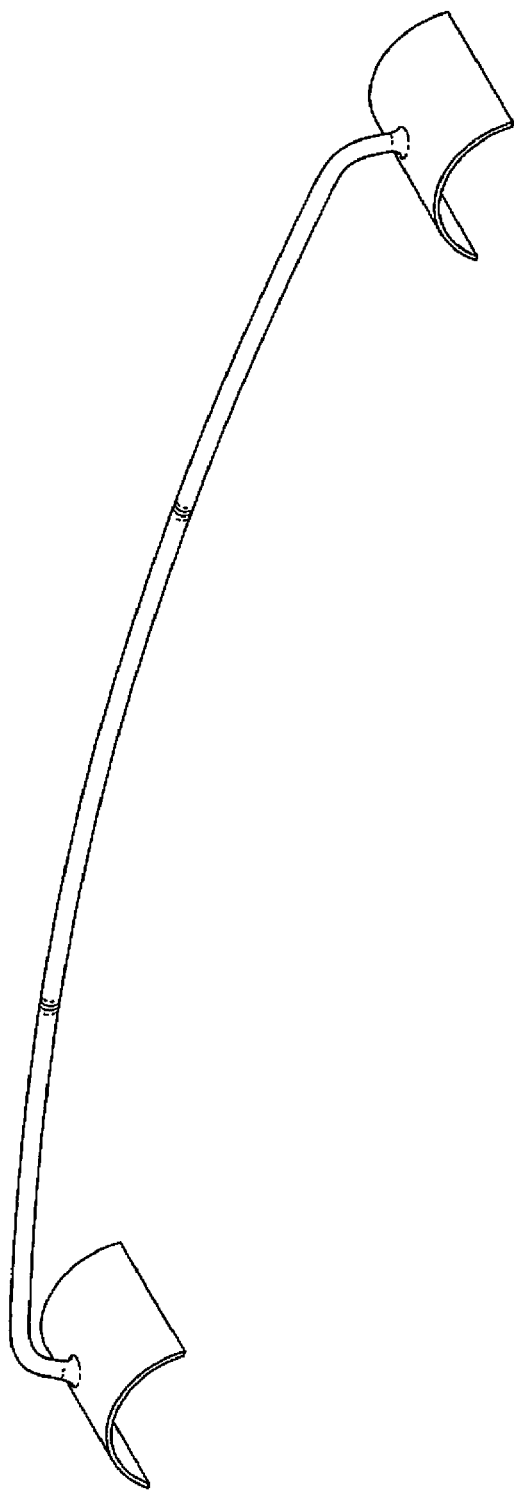
FIG. 1 is a front perspective view of a retaining device in the preferred embodiment of the present invention.

The present invention relates to an apparatus and method for reducing an interior noise level of a vehicle having a soft top. FIG. 1 is front perspective view of a retaining device 10 in the preferred embodiment of the present invention. The retaining device includes a main extension bar 12 having two ends 14 and 16. At each end is a coupling mechanism 18. In the preferred embodiment of the present invention, the coupling mechanism 18 includes a curved coupler 20. The main extension bar includes a main section 22. The ends extend downward from the main section 22 providing a vertical height from the bottom of each of the curved coupler 20 to the top of the main extension bar. Preferably, the retaining device 10 is constructed of a rigid material, such as steel, plastic, etc.

Figure 2:
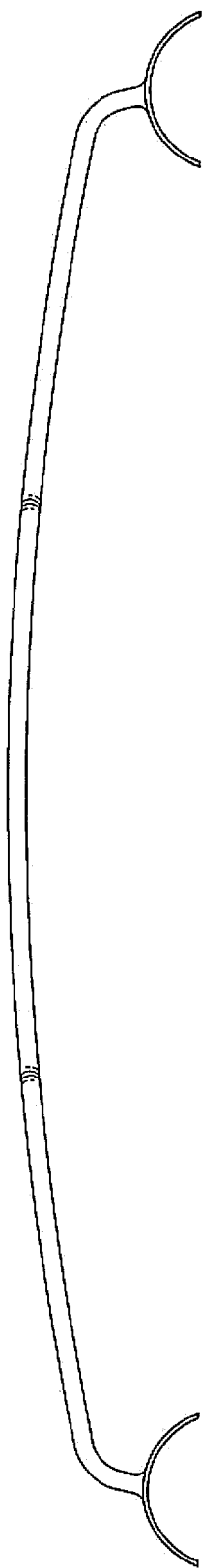
FIG. 2 is a front view of the retaining device of FIG. 1.
Figure 3:
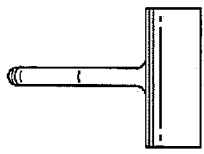
FIG. 3 is a side view of the coupling mechanism.

FIG. 2 is a front view of the retaining device 10 of FIG. 1. FIG. 3 is a side view of the coupling mechanism 18. In the preferred embodiment of the present invention, the main section has a slight curvature to accommodate a soft top roof of a vehicle. The curved couplers are curved to accommodate placement on a roll bar or other support on the vehicle. Specifically, the curved couplers are sized and shaped to hold the retaining device in place upon roll bars of a vehicle (see FIGS. 4 and 5).

Figure 4:
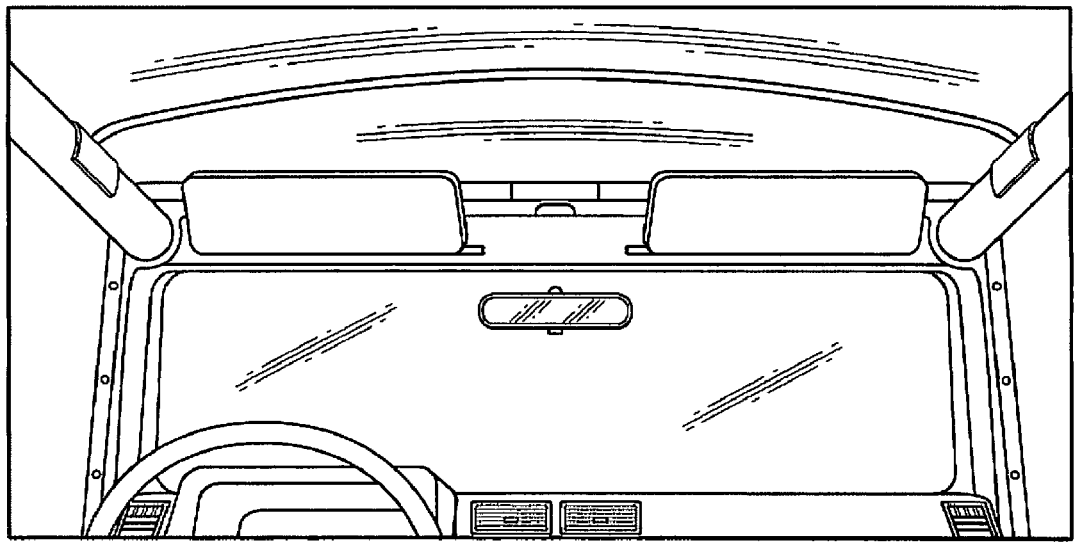
FIG. 4 is a rear interior view of the retaining device mounted in a vehicle.

FIG. 4 is a rear interior view of the retaining device 10 mounted in a vehicle 30. The vehicle includes a soft top roof 32 and two roll bars 34. The roll bars may be any size, shape, number or orientation. As depicted, the roll bars run longitudinally parallel to the vehicle 30. The retaining device is mounted upon the roll bars 34 by placing the curved couplers on a top surface 40 of the roll bars. The main extension bar 12 then spans the width of the roof. The retaining device 10 is held in place by the force of the soft top roof 32 upon the main extension bar 12 as well as the curved couplers 20 upon the roll bars. It should be understood that the curved couplers may be configured in any manner to attach to any configuration of roll bars and still remain in the scope of the invention.

Figure 5:
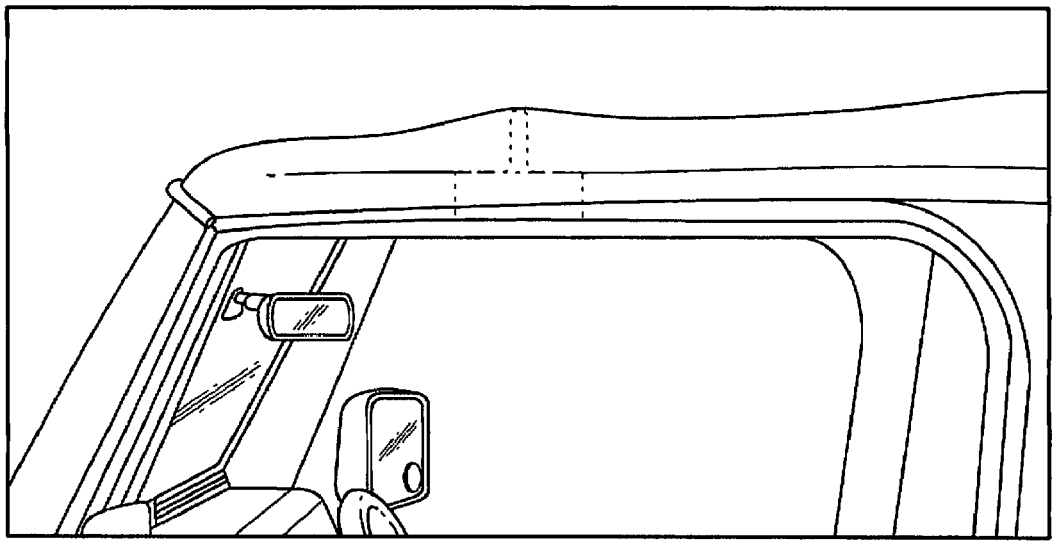
FIG. 5 is a side view of the retaining device mounted on the vehicle.

FIG. 5 is a side view of the retaining device 10 mounted on the vehicle 30. The main extension 12 presses the soft top roof 32 upward, thereby tightening the fabric. Any wind rushing underneath or above the soft top roof is unable to cause significant movement of the soft top roof. Thus, the roof 32 and its associated wind no longer cause significant noise in the interior of the vehicle.

With reference to FIGS. 1-5, the operation of the retaining device 10 will now be explained. The retaining device is positioned within the vehicle by placing one curved coupler 20 on each roll bar 34. The main extension bar 12 is placed below the soft top roof 32 and preferably spans the width of the soft top roof. The main extension bar 12 rises above the two coupling mechanisms, thereby providing a vertical spacing between the bottom of the curved couplers 20 and the top of the main extension bar 12. With this additional vertical spacing, the soft top roof is pushed upward. The soft top roof, because of this upward force, is held taut. With a taut soft top roof, movement or flapping of the roof is significantly reduced, resulting in a reduced noise level. When desired, the retaining device 10 may be removed.

Figure 6:
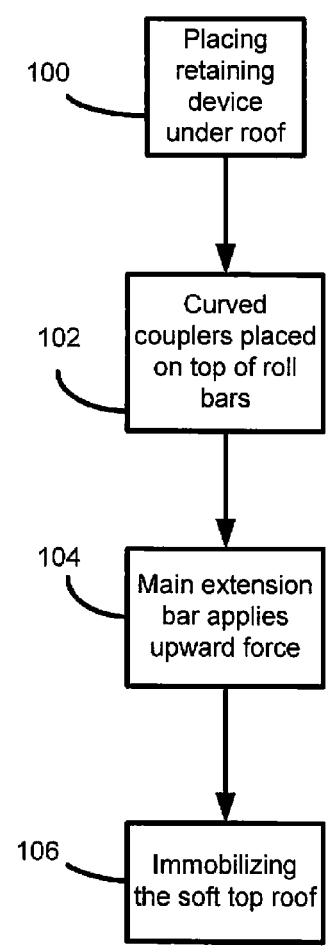
FIG. 6 is a flow chart illustrating the steps of the method of decreasing noise in a vehicle having a soft top roof according to the teachings of the present invention.

FIG. 6 is a flow chart illustrating the steps of the method of decreasing noise in a vehicle using a soft top roof according to the teachings of the present invention. With reference to FIGS. 1-6, the method will now be explained. In step 100, the retaining device 10 is placed under the lower surface of the soft top roof 32. Next, in step 102, each curved coupler 20 is positioned on top of each roll bar 34. In step 104, the main extension bar 12 applies upward force against the soft top roof 32. Next, in step 106, a portion of the soft top roof is immobilized. By immobilizing a portion of the soft top roof, any noise due to movement of the soft top roof is reduced.

The present invention provides an apparatus and method for reducing noise in an interior of a vehicle having a soft top roof. The apparatus is easy to install and remove. In an alternate embodiment of the present invention, the main extension bar 12 is telescopic, thereby being extendable to accommodate roofs of different widths. In another embodiment of the present invention, the coupling mechanisms include telescopic extensions for extending the vertical space from the bottom of the curved coupler 20 to the top of the main extension bar 12. In still another alternate embodiment of the present invention, the coupling mechanisms are removable.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for reducing noise in a vehicle having a soft top roof, the system comprising:
   the vehicle having the soft top roof and a plurality of roll bars;
   an apparatus for reducing noise, the apparatus comprising:
      a main extension bar having a first end and an opposing second end; means for attaching the apparatus to the roll bars of the vehicle;
   whereby the apparatus is attached to the roll bars and the main extension bar exerts upward force against the soft top roof of the vehicle, thereby reducing movement of the soft top roof.

2. The system according to claim 1 wherein the means for attaching the apparatus to the roll bars includes:
   a first coupling mechanism affixed to the first end; and
   a second coupling mechanism affixed to the second end.

3. The system according to claim 2 wherein:
   the first coupling mechanism includes a first curved coupler; and
   the second coupling mechanism includes a second curved coupler;
   whereby each curved coupler is placed on at least one of the roll bars of the vehicle.

4. The system according to claim 3 wherein each curved coupler is sized and shaped to allow placement upon a top portion of at least one of the roll bars of the vehicle.

5. The system according to claim 3 wherein each coupling mechanism extends downward from each end to provide a vertical height from a bottom surface of each coupling mechanism to a top portion of the main extension bar.

6. The system according to claim 1 wherein the main extension bar includes a slight curvature.

7. The system according to claim 1 wherein the main extension bar is telescopic to accommodate a different width of the soft top roof.

8. The system according to claim 1 wherein each end is telescopic.

9. The system according to claim 1 wherein each end is removable from the main extension bar.

* * * * *